US012785147B2

(12) United States Patent
Cui et al.

(10) Patent No.: US 12,785,147 B2
(45) **Date of Patent: *Nov. 3, 2026**

(54) ELECTROCHEMICAL DEVICE AND ELECTRONIC DEVICE CONTAINING SAME

(71) Applicant: Ningde Amperex Technology Limited, Ningde (CN)

(72) Inventors: Hui Cui, Ningde (CN); Wenqiang Li, Ningde (CN); Chao Tang, Ningde (CN)

(73) Assignee: Ningde Amperex Technology Limited, Ningde City (CN)

( * ) Notice: Subject to any disclaimer, the term of this patent is extended or adjusted under 35 U.S.C. 154(b) by 549 days.

This patent is subject to a terminal disclaimer.

(21) Appl. No.: 18/452,049

(22) Filed: Aug. 18, 2023

(65) Prior Publication Data

US 2023/0395859 A1 Dec. 7, 2023

Related U.S. Application Data

(63) Continuation of application No. PCT/CN2021/106704, filed on Jul. 16, 2021.

(30) Foreign Application Priority Data

Feb. 20, 2021 (CN) ......................... 202110193444.1

(51) Int. Cl.

| | |
|---|---|
| ***H01M 10/0567*** | (2010.01) |
| ***H01M 4/131*** | (2010.01) |
| ***H01M 4/525*** | (2010.01) |
| ***H01M 10/0525*** | (2010.01) |
| ***H01M 10/0569*** | (2010.01) |
| ***H01M 10/42*** | (2006.01) |
| *H01M 4/02* | (2006.01) |

(52) U.S. Cl.

CPC ....... *H01M 10/0567* (2013.01); *H01M 4/131* (2013.01); *H01M 4/525* (2013.01); *H01M 10/0525* (2013.01); *H01M 10/4235* (2013.01); *H01M 2004/021* (2013.01); *H01M 2004/028* (2013.01); *H01M 2300/0025* (2013.01)

(58) Field of Classification Search

None

See application file for complete search history.

(56) References Cited

U.S. PATENT DOCUMENTS

2021/0265622 A1 8/2021 Sato et al.

FOREIGN PATENT DOCUMENTS

| | | | | |
|---|---|---|---|---|
| CN | 101604768 B | 8/2011 | | |
| CN | 108899497 A | 11/2018 | | |
| CN | 109473713 A | 3/2019 | | |
| CN | 109860546 A | 6/2019 | | |
| CN | 110504415 A | 11/2019 | | |
| CN | 110739485 A | 1/2020 | | |
| CN | 110911745 A | 3/2020 | | |
| CN | 110915032 A | 3/2020 | | |
| CN | 110915035 A | 3/2020 | | |
| CN | 111525191 A | 8/2020 | | |
| CN | 111557061 A | 8/2020 | | |
| CN | 111628218 A | 9/2020 | | |
| CN | 106505194 B | 10/2020 | | |
| CN | 111740162 A | 10/2020 | | |
| CN | 111867979 A | 10/2020 | | |
| CN | 111900480 A | 11/2020 | | |
| CN | 112005411 A | 11/2020 | | |
| CN | 112103561 A | 12/2020 | | |
| CN | 112117491 A | 12/2020 | | |
| CN | 112151866 A | 12/2020 | | |
| CN | 113013480 A | 6/2021 | | |
| EP | 3627606 A | 3/2020 | | |
| EP | 3644415 A2 | 4/2020 | | |
| WO | 2011024837 A1 | 3/2011 | | |
| WO | WO-2019009177 A1 | * | 1/2019 | ........ H01M 10/0585 |
| WO | 2020110799 A1 | 6/2020 | | |
| WO | 111740162 A | * | 10/2020 | |

OTHER PUBLICATIONS

International Search Report issued on Oct. 26, 2021, in corresponding application No. PCT/CN2021/106704; 6 pages.
Chinese Office Action issued on Jan. 5, 2022, in corresponding application No. 202110193444.1; 12 pages.
Extended Search Report issued on May 26, 2025, in corresponding European Application No. 21926266.4, 13 pages.
Office Action issued on Jan. 2, 2025, in corresponding Indian Application No. 202327063266, 6 pages.
Decision of Refusal issued on Jun. 6, 2022, in corresponding Chinese Application No. 202110193444.1, 14 pages.
Reexamination Notification issued on Feb. 24, 2023, in corresponding Chinese Application No. 202110193444.1, 15 pages.
Reexamination Decision issued on Apr. 26, 2023, in corresponding Chinese Application No. 202110193444.1, 36 pages.
Office Action issued on Feb. 23, 2022, in corresponding Chinese Application No. 202110193444.1, 19 pages.
Li et al., "Research on Key Technologies of New Energy Vehicles", Beijing Institute of Technology Press, Dec. 2017, 9 pages.
Meng et al., "Some Frontier Research Topics in Materials Chemistry", University of Science and Technology of China Press, Jan. 2013,13 pages.

(Continued)

*Primary Examiner* — Tracy M Dove
(74) *Attorney, Agent, or Firm* — Maier & Maier, PLLC

(57) ABSTRACT

An electrochemical device includes a positive electrode and an electrolytic solution. The positive electrode includes a positive current collector and a positive active material layer disposed on at least one surface of the positive current collector. The positive active material layer includes a positive active material. The positive active material contains an Mg element. Based on a total weight of the positive active material, a weight of the Mg element is X ppm, and $300 \leq X \leq 30000$. The electrolytic solution contains carboxylate. Based on a total weight of the electrolytic solution, a weight percent of the carboxylate is Y %, and $Y \leq 60$. The electrochemical device satisfies $5 \leq X/Y \leq 6000$. The electrochemical device effectively improve the high-temperature cycle performance and low-temperature discharge performance of the electrochemical device by controlling a relationship between the electrolytic solution and the positive active material.

21 Claims, No Drawings

(56) References Cited

OTHER PUBLICATIONS

Xiao, "Pure Electric Vehicle Basics", Hubei Science and Technology Press, Apr. 2018, First Edition, 7 pages.
Fang, "Electrochemical Energy Storage Devices and Key Materials", Beijing: Metallurgical Industry Press, Jul. 2019, 8 pages.
Huang et al., "Electrochemical Energy Storage Applications of Two-Dimensional Transition Metal Dichalcogenides", Metallurgical Industry Press, Sep. 2018, 13 pages.
Lu et al., "Structure and Performance of Layered Lithium-rich Cathode Materials", Beijing Institute of Technology Press, Apr. 2020, 8 pages.
Extended Search Report issued on Mar. 10, 2026, in corresponding European Application No. 25215705.2, 11 pages.
Extended Search Report issued on Mar. 10, 2026, in corresponding European Application No. 25215702.9, 11 pages.
Office Action issued on Feb. 3, 2026, in related U.S. Appl. No. 19/398,629, 24 pages.
Office Action issued on Feb. 4, 2026, in related U.S. Appl. No. 19/398,742, 27 pages.

* cited by examiner

ELECTROCHEMICAL DEVICE AND ELECTRONIC DEVICE CONTAINING SAME

CROSS-REFERENCE TO RELATED APPLICATIONS

This application is a continuation application of International Application No. PCT/CN2021/106704, filed on Jul. 16, 2021, which claims the benefit of priority of Chinese patent application No. 202110193444.1, filed on Feb. 20, 2021, the contents of which are incorporated herein by reference in its entirety.

TECHNICAL FIELD

This application relates to the technical field of energy storage, and in particular, to an electrochemical device and an electronic device containing same.

BACKGROUND

Lithium-ion batteries are widely used in the fields such as wearable devices, smart phones, unmanned aerial vehicles, and notebook computers by virtue of advantages such as a high working voltage, a high energy density, environmental friendliness, stable cycling, and safety. With the progress of modern information technology and the expansion of the application of the lithium-ion batteries, higher requirements such as excellent cycle performance and low-temperature discharge performance are posed on the lithium-ion batteries. The interaction between an electrolytic solution and a positive or negative electrode exerts a huge impact on such performance. Especially, when the working voltage is increased to 4.4 V to improve the energy density, instability of an interface between the electrolytic solution and the positive electrode increases, and the cycle performance and the low-temperature discharge performance deteriorate, thereby bottlenecking the performance of the lithium-ion batteries drastically.

Existing lithium-ion battery technologies usually optimize the electrolytic solution or the positive electrode alone, but lack in-depth innovation of the entire system, thereby being unable to achieve overall performance enhancement.

SUMMARY

This application provides an electrochemical device in an attempt to solve at least one problem in the related art to at least some extent. An embodiment of this application further provides an electronic device containing the electrochemical device.

According to one aspect, this application provides an electrochemical device. The electrochemical device includes a positive electrode and an electrolytic solution. The positive electrode includes a positive current collector and a positive active material layer disposed on at least one surface of the positive current collector. The positive active material layer includes a positive active material. The positive active material contains an Mg element. Based on a total weight of the positive active material, a weight of the Mg element is X ppm, and $300 \le X \le 30000$. The electrolytic solution contains carboxylate. Based on a total weight of the electrolytic solution, a weight percent of the carboxylate is Y %, and $Y \le 60$. The electrochemical device satisfies $5 \le X/Y \le 6000$.

According to some embodiments of this application, $Dn_{50}$ of particles of the positive active material is A μm, and $2 \le A \le 25$.

According to some embodiments of this application, the electrochemical device satisfies $0.04 \le A/Y \le 6.25$.

According to some embodiments of this application, the positive active material satisfies at least one of conditions (a) to (d): (a) a specific surface area of the positive active material is C $m^2/g$, and $0.004 \le C/Y \le 0.1$; (b) $Dv_{10}/Dn_{10}$ of the particles of the positive active material is Z, and $1.5 \le Z \le 11$; (c) the positive active material further includes an M1 element, and the M1 element includes at least one of Al, Mo, Zr, Ti, Fe, V, Cr, Ba, Sr, or Nb; and (d) the positive active material layer includes an M2 element, and the M2 element includes at least one of F, B, Cl, S, or P.

According to some embodiments of this application, particles of the positive active material satisfy at least one of condition (e) or condition (f): (e) $Dv_{10}$ of the particles of the positive active material falls within a range of 2.2 μm to 4.1 μm; and (f) $Dn_{10}$ of the particles of the positive active material falls within a range of 0.35 μm to 1.4 μm.

According to some embodiments of this application, a compacted density of the positive active material layer is greater than or equal to 4.0 $g/cm^3$.

According to some embodiments of this application, the carboxylate includes at least one of ethyl acetate, propyl acetate, ethyl propionate, methyl propionate, propyl propionate, butyl propionate, pentyl propionate, ethyl butyrate, butyl butyrate, propyl butyrate, or pentyl butyrate.

According to some embodiments of this application, the electrolytic solution further includes a polynitrile compound, and the polynitrile compound includes at least one of an ether-free dinitrile compound, an ether dinitrile compound, an ether-free trinitrile compound, or an ether trinitrile compound.

According to some embodiments of this application, the polynitrile compound contained in the electrolytic solution satisfies at least one of conditions (g) to (j): (g) the ether-free dinitrile compound includes at least one of malononitrile, succinonitrile, glutaronitrile, adiponitrile, pimelonitrile, suberonitrile, azelanitrile, sebaconitrile, methyl malononitrile, ethyl malononitrile, isopropyl malononitrile, tert-butyl malononitrile, methyl succinonitrile, 2-methylene glutaronitrile, 1,4-dicyano-3-butene, 2,2-dimethyl succinonitrile, 2,3-dimethyl succinonitrile, 2,3,3-trimethyl succinonitrile, 2,2,3,3-tetramethyl succinonitrile, 2,3-diethyl-2,3-dimethyl succinonitrile, 2,2-diethyl-3,3-dimethyl succinonitrile, dicyclohexyl-1,1-dicarbonitrile, dicyclohexyl-2, 2-dicarbonitrile, dicyclohexyl-3,3-dicarbonitrile, 2,5-dimethyl-2,5-hexane dicarbonitrile, 2,3-diisobutyl-2,3-dimethyl succinonitrile, 2,2-diisobutyl-3,3-dimethyl succinonitrile, 2-methyl glutaronitrile, 2,3-dimethyl glutaronitrile, 2,4-dimethyl glutaronitrile, 2,2,3,3-tetramethyl glutaronitrile, 2,2,4,4-tetramethyl glutaronitrile, 2,2,3,4-tetramethyl glutaronitrile, 2,3,3,4-tetramethyl glutaronitrile, 1,4-dicyanopentane, 2,6-dicyanoheptane, 2,7-dicyanooctane, 2,8-dicyanononane, 1,6-dicyanodecane, 1,2-dicyanobenzene, 1,3-dicyanobenzene, 1,4-dicyanobenzene, 3,3'-(ethylenedioxy) dipropionitrile, 3,3'-(ethylene disulfide) dipropionitrile, 1,4-dicyano-2-butene, or fumaronitrile;

(h) the ether dinitrile compound includes:

at least one of

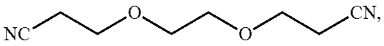,

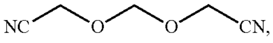, or

-continued

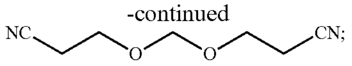

(i) the ether-free trinitrile compound includes:
at least one of

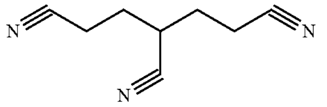

or

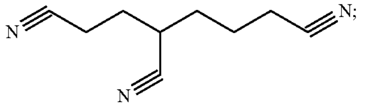

and (j) the ether trinitrile compound includes:
at least one of

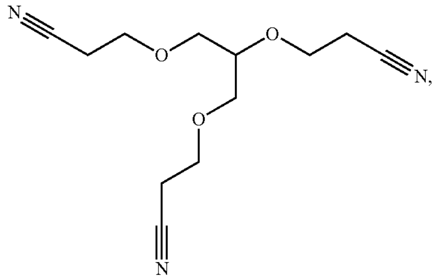

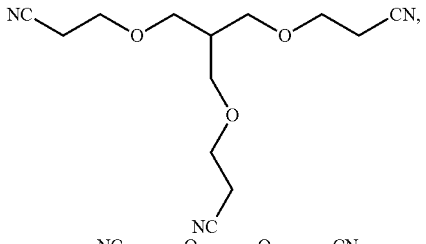

or

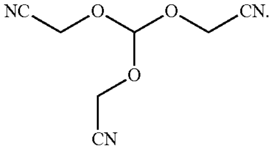

According to some embodiments of this application, based on the total weight of the electrolytic solution, a weight percent of the ether-free dinitrile compound is B %, and $0.0001 \leq B/X \leq 0.02$.

According to some embodiments of this application, the polynitrile compound includes at least an ether dinitrile compound and a trinitrile compound. The trinitrile compound includes at least one of the ether-free trinitrile compound or the ether trinitrile compound. Based on the total weight of the electrolytic solution, a weight percent of the ether dinitrile compound is H %, a weight percent of the trinitrile compound is G %, and $H/G \leq 2$.

According to some embodiments of this application, the polynitrile compound includes at least an ether-free dinitrile compound. The ether-free dinitrile compound includes a saturated dinitrile compound and an unsaturated dinitrile compound. Based on the total weight of the electrolytic solution, a weight percent of the saturated dinitrile compound is Q %, a weight percent of the unsaturated dinitrile compound is V %, and $0.05 \leq V/Q \leq 1$.

Another aspect of this application provides an electronic device. The electronic device includes any one of the electrochemical devices described above.

Additional aspects and advantages of the embodiments of this application will be described or illustrated in part later herein or expounded through implementation of the embodiments of this application.

DETAILED DESCRIPTION

Embodiments of this application will be described in detail below. The embodiments described herein are illustrative in nature, and are intended to enable a basic understanding of this application. The embodiments of this application are not to be construed as a limitation on this application.

The term "approximately" used herein is intended to describe and represent small variations. When used with reference to an event or situation, the terms may denote an example in which the event or situation occurs exactly and an example in which the event or situation occurs very approximately. For example, when used together with a numerical value, the term may represent a variation range falling within ±10% of the numerical value, such as ±5%, ±4%, ±3%, ±2%, ±1%, ±0.5%, ±0.1%, or ±0.05% of the numerical value. For example, if a difference between two numerical values falls within ±10% of an average of the numerical values (such as ±5%, ±4%, ±3%, ±2%, ±1%, ±0.5%, ±0.1%, or ±0.05% of the average), the two numerical values may be considered to be "approximately" the same.

In addition, a quantity, a ratio, or another numerical value is sometimes expressed in a range format herein. Understandably, such a range format is for convenience and brevity, and shall be flexibly understood to include not only the numerical values explicitly specified and defined in the range, but also all individual numerical values or sub-ranges covered in the range as if each individual numerical value and each sub-range were explicitly specified.

In the embodiments and claims, a list of items referred to by using the terms such as "at least one of", "at least one thereof", "at least one type of" or other similar terms may mean any combination of the listed items. For example, if items A and B are listed, the phrases "at least one of A and B" and "at least one of A or B" mean: A alone; B alone; or both A and B. In another example, if items A, B, and C are listed, the phrases "at least one of A, B, and C" and "at least one of A, B, or C" mean: A alone; B alone; C alone; A and B (excluding C); A and C (excluding B); B and C (excluding A); or all of A, B, and C. The item A may include a single component or a plurality of components. The item B may include a single component or a plurality of components. The item C may include a single component or a plurality of components.

This application provides an electrochemical device. The electrochemical device includes a positive electrode and an electrolytic solution. A positive active material in the positive electrode contains an Mg element, and the electrolytic solution contains carboxylate. The electrochemical device according to this application meets the requirement of charging at a high voltage (a voltage greater than or equal to 4.4 V), and still maintains good high-temperature cycle performance and low-temperature discharge performance when the working voltage is greater than or equal to 4.4 V.

The carboxylate is of a relatively low viscosity, and reduces an impedance of the electrochemical device and improves charge and discharge performance, but affects interface stability.

A dopant element Mg in the positive active material can occupy a lithium site after the positive electrode is delithiated, thereby stabilizing the positive electrode structure and alleviating structural distortion during cycling.

This application has studied a relationship between content of the carboxylate in the electrolytic solution and content of the dopant element Mg in the positive active material, and optimizes the entire electrochemical device system, thereby improving the high-temperature cycle performance and low-temperature discharge performance of the electrochemical device.

I. Electrochemical Device

This application provides an electrochemical device. The electrochemical device includes a positive electrode and an electrolytic solution. The positive electrode includes a positive current collector and a positive active material layer disposed on at least one surface of the positive current collector. The positive active material layer includes a positive active material. The positive active material contains an Mg element. Based on a total weight of the positive active material, a weight of the Mg element is X ppm, and $300 \leq X \leq 30000$. The electrolytic solution contains carboxylate. Based on a total weight of the electrolytic solution, a weight percent of the carboxylate is Y %, and $Y \leq 60$. The electrochemical device satisfies $5 \leq X/Y \leq 6000$. The electrochemical device according to this application achieves excellent high-temperature cycle performance and low-temperature discharge performance.

In some embodiments, X may be approximately 300, approximately 500, approximately 1000, approximately 2000, approximately 2500, approximately 3000, approximately 4000, approximately 5000, approximately 6000, approximately 7000, approximately 7500, approximately 10000, approximately 15000, approximately 20000, approximately 25000, approximately 30000, or may fall within a range formed by any two thereof, for example, approximately 300 to approximately 1000, approximately 300 to approximately 7500, approximately 500 to approximately 10000, approximately 100 to approximately 10000, approximately 100 to approximately 20000, or approximately 500 to approximately 30000.

In some embodiments, Y may be approximately 5, approximately 10, approximately 15, approximately 20, approximately 25, approximately 30, approximately 40, approximately 50, approximately 60, or may fall within a range formed by any two thereof, for example, approximately 5 to approximately 10, approximately 10 to approximately 30, approximately 30 to approximately 60, or approximately 10 to approximately 60. If the content of the carboxylate is too high, the carboxylate will lead to interface instability and affect the cycle performance of the electrochemical device.

In some embodiments, X/Y may be approximately 5, approximately 100, approximately 125, approximately 500, approximately 1000, approximately 2000, approximately 3000, approximately 4000, approximately 5000, approximately 6000, or may fall within a range formed by any two thereof, for example, approximately 5 to approximately 125, approximately 5 to approximately 500, approximately 5 to approximately 2000, approximately 125 to approximately 2000, approximately 125 to approximately 6000, approximately 2000 to approximately 6000.

In some embodiments, $Dn_{50}$ of the particles of the positive active material is A μm, and $2 \leq A \leq 25$. In some embodiments, A may be approximately 2, approximately 2.4, approximately 5, approximately 10, approximately 15, approximately 17, approximately 20, approximately 25, or may fall within a range formed by any two thereof, for example, approximately 2 to approximately 10, approximately 5 to approximately 25, approximately 15 to approximately 25, or approximately 2.4 to approximately 25. $Dn_{50}$ is a corresponding particle size when a cumulative number distribution percentage of the particles reaches 50%. The particle size of the particles of the positive active material according to this application is relatively small. Therefore, a transmission path of lithium ions is short, thereby improving high-temperature stability of the system while ensuring excellent low-temperature performance.

In some embodiments, the electrochemical device further satisfies $0.04 \leq A/Y \leq 6.25$. In some embodiments, A/Y may be approximately 0.04, approximately 0.1, approximately 0.2, approximately 0.25, approximately 0.5, approximately 0.57, approximately 1, approximately 1.5, approximately 2, approximately 2.5, approximately 3, approximately 3.5, approximately 4, approximately 5, approximately 6, approximately 6.25, or may fall within a range formed by any two thereof, for example, approximately 0.04 to approximately 1.5, approximately 0.25 to approximately 1, approximately 0.25 to approximately 1.5, approximately 2 to approximately 6.25, approximately 3 to approximately 6.25.

In some embodiments, the electrochemical device simultaneously satisfies $\leq X/Y \leq 6000$ and $0.04 \leq A/Y \leq 6.25$, so that the electrochemical device further achieves excellent cycle performance and low-temperature discharge performance.

In some embodiments, the positive active material satisfies at least one of conditions (a) to (d): (a) a specific surface area of the positive active material is C $m^2/g$, and $0.004 \leq C/Y \leq 0.1$; (b) $Dv_{10}/Dn_{10}$ of the particles of the positive active material is Z, and $1.5 \leq Z \leq 11$; (c) the positive active material further includes an M1 element, and the M1 element includes at least one of Al, Mo, Zr, Ti, Fe, V, Cr, Ba, Sr, or Nb; and (d) the positive active material layer includes an M2 element, and the M2 element includes at least one of F, B, Cl, S, or P.

In some embodiments, the specific surface area of the positive active material is C $m^2/g$, and the electrochemical device satisfies $0.004 \leq C/Y \leq 0.1$, thereby further improving the high-temperature cycle performance and low-temperature discharge performance of the electrochemical device. If the specific surface area is too large, side reactions between the particles of the positive active material and the electrolytic solution will aggravate, and the cycle performance and the discharge performance will deteriorate. If the specific surface area is too small, the number of positive electrode particles required to achieve the same capacity increases, and the transmission path of the lithium ions becomes longer, thereby affecting the discharge performance. In some embodiments, C/Y may be approximately 0.004, approximately 0.01, approximately 0.015, approximately 0.02, approximately 0.05, approximately 0.08, approximately 0.1, or may fall within a range formed by any two thereof, for example, approximately 0.004 to approximately 0.01, approximately 0.01 to approximately 0.05, approximately 0.01 to approximately 0.1, or approximately 0.05 to approximately 0.1.

In some embodiments, $Dv_{10}/Dn_{10}$ of the particles of the positive active material is Z, and 1.5≤Z≤11. In some embodiments, Z may be approximately 1.5, approximately 2, approximately 3, approximately 4, approximately 5, approximately 5.5, approximately 6, approximately 7, approximately 8, approximately 9, approximately 10, approximately 11, or may fall within a range formed by any two thereof, for example, approximately 1.5 to approximately 5.5, approximately 5.5 to approximately 11, or approximately 3 to approximately 11. $Dv_{10}$ is a corresponding particle size when a cumulative volume distribution percentage of the particles reaches 10%. $Dn_{10}$ is a corresponding particle size when a cumulative number distribution percentage of the particles reaches 10%.

In some embodiments, the positive active material further includes an M1 element. The M1 element includes at least one of Al, Mo, Zr, Ti, Fe, V, Cr, Ba, Sr, or Nb. In some embodiments, the M1 element includes Al. In some embodiments, the M1 element includes Al and Ti. In some embodiments, the M1 element includes Al, Ti, and Zr. In some embodiments, the M1 element includes Cr and Ba. The positive active material further includes the M1 element, thereby further stabilizing the positive electrode structure and improving the cycle performance of the electrochemical device. If the content of the M1 element is too low, the improvement effect is not obvious; or, if the content of M1 element is too high, the actual discharge capacity will be affected due to the decrease of the Li content.

In some embodiments, based on the total weight of the positive active material, the weight percent of the M1 element is D ppm, and 300≤D≤20000. In some embodiments, D may be approximately 300, approximately 350, approximately 500, approximately 1000, approximately 2000, approximately 3000, approximately 5000, approximately 6000, approximately 7000, approximately 8000, approximately 10000, approximately 15000, approximately 20000, or may fall within a range formed by any two thereof, for example, approximately 350 to approximately 5000, approximately 2000 to approximately 5000, or approximately 5000 to approximately 20000.

In some embodiments, the positive active material layer includes an M2 element, and the M2 element includes at least one of F, B, Cl, S, or P. In some embodiments, the M2 element includes F and P. The M2 element is mainly an ingredient of a positive electrode interface, and may come from a coating layer on the surface of the particles of the positive active material, or from a protection film generated in electrolyte reaction. The M2 element can protect the reaction of the electrolytic solution on the positive electrode interface, thereby improving the cycle performance of the electrochemical device.

In some embodiments, based on the total weight of the positive active material, the weight percent of the M2 element is approximately 0.01% to approximately 20%. In some embodiments, the weight percent of M2 may be approximately 0.01%, approximately 0.05%, approximately 0.1%, approximately 0.5%, approximately 1%, approximately 1.5%, approximately 2%, approximately 3%, approximately 4%, approximately 5%, approximately 5.5%, approximately 6%, approximately 10%, approximately 15%, approximately 20%, or may fall within a range formed by any two thereof, for example, approximately 0.01% to approximately 15%, approximately 1% to approximately 15%, approximately 0.1% to approximately 10%, or approximately 1% to approximately 20%.

In some embodiments, the particles of the positive active material satisfy at least one of condition (e) or condition (f): (e) $Dv_{10}$ of the particles of the positive active material falls within a range of 2.2 μm to 4.1 μm; and (f) $Dn_{10}$ of the particles of the positive active material falls within a range of 0.35 μm to 1.4 μm.

In some embodiments, $Dv_{10}$ of the particles of the positive active material is approximately 2.2 μm, approximately 2.5 μm, approximately 3 μm, approximately 3.5 μm, approximately 4 μm, approximately 4.1 μm, or may fall within a range formed by any two thereof, for example, approximately 2.2 μm to approximately 3.5 μm, approximately 3 μm to approximately 4 μm, or approximately 2.5 μm to approximately 4.1 μm.

In some embodiments, $Dn_{10}$ of the particles of the positive active material is approximately 0.35 μm, approximately 0.5 μm, approximately 0.7 μm, approximately 0.8 μm, approximately 1.0 μm, approximately 1.2 μm, approximately 1.4 μm, or may fall within a range formed by any two thereof, for example, approximately 0.35 μm to approximately 0.8 μm, approximately 0.5 μm to approximately 1.0 μm, or approximately 0.5 μm to approximately 1.4 μm.

In some embodiments, the particles of the positive active material satisfy at least one of conditions (a) to (f).

In some embodiments, a compacted density of the positive active material layer is greater than or equal to 4.0 $g/cm^3$. In some embodiments, the compacted density of the positive active material layer may be 4.0 $g/cm^3$, 4.10 $g/cm^3$, 4.23 $g/cm^3$, 4.5 $g/cm^3$, greater than or equal to 4.1 $g/cm^3$, or, greater than or equal to 4.23 $g/cm^3$ or greater than or equal to 4.0 $g/cm^3$ and less than or equal to 4.5 $g/cm^3$. When the compacted density of the positive active material layer is too low, the transmission path between the positive electrode particles is long, thereby being adverse to the cycle performance and high-temperature storage performance of the electrochemical device.

The positive active material in the positive active material layer according to this application may include any material known in the art. In some embodiments, the positive active material includes lithium cobalt oxide ($LiCoO_2$), a lithium nickel-cobalt-manganese (NCM) ternary material, lithium ferrous phosphate ($LiFePO_4$), lithium manganese oxide ($LiMn_2O_4$), or any combination thereof.

In some embodiments, the positive active material layer further includes a binder, and optionally includes a conductive material. The binder strengthens bonding between particles of the positive active material, and strengthens bonding between the positive active material and a positive current collector.

In some embodiments, the binder includes, but is not limited to: polyvinyl alcohol, hydroxypropyl cellulose, diacetyl cellulose, polyvinyl chloride, carboxylated polyvinyl chloride, polyvinyl fluoride, a polymer containing ethylene oxide, polyvinylpyrrolidone, polyurethane, polytetrafluoroethylene, poly (1,1-difluoroethylene), polyethylene, polypropylene, styrene-butadiene rubber, acrylic styrene-butadiene rubber, epoxy resin, nylon, or the like.

In some embodiments, the conductive material includes, but is not limited to, a carbon-based material, a metal-based material, a conductive polymer, and a mixture thereof. In some embodiments, the carbon-based material is selected from natural graphite, artificial graphite, carbon black, acetylene black, Ketjen black, carbon fiber, or any combination thereof. In some embodiments, the metal-based material is selected from metal powder, metal fiber, copper, nickel, aluminum, or silver. In some embodiments, the conductive polymer is a polyphenylene derivative.

In some embodiments, the positive current collector may be, but is not limited to, aluminum.

The positive electrode may be prepared according to a preparation method known in the art. For example, the positive electrode may be obtained by the following method: mixing a positive active material, a conductive material, and a binder in a solvent to prepare an active material composite, and coating the positive current collector with the active material composite. In some embodiments, the solvent may include, is not limited to, N-methyl-pyrrolidone.

In some embodiments, the positive electrode is made of a positive material formed by applying a positive active material layer onto the positive current collector, where the positive active material layer includes a lithium transition metal-based compound powder and a binder.

In some embodiments, the positive active material layer generally may be made by performing the following operations: dry-mixing the positive active material and the binder (as necessary, in addition to a conductive material and a thickener) and making the mixture into a sheet, and crimping the obtained sheet onto the positive current collector; or, dissolving or dispersing such materials into a liquid medium to form a slurry, coating the positive current collector with the slurry, and drying the slurry.

In some embodiments, the carboxylate in the electrolytic solution includes at least one of ethyl acetate, propyl acetate, ethyl propionate, methyl propionate, propyl propionate, butyl propionate, pentyl propionate, ethyl butyrate, butyl butyrate, propyl butyrate, or pentyl butyrate. In some embodiments, the carboxylate may include ethyl propionate. In some embodiments, the carboxylate may include propyl propionate. In some embodiments, the carboxylate may include ethyl acetate. In some embodiments, the carboxylate may include ethyl propionate and ethyl acetate. In some embodiments, the carboxylate may include ethyl propionate and propyl propionate.

In some embodiments, the electrolytic solution further includes a polynitrile compound, and the polynitrile compound includes at least one of an ether-free dinitrile compound, an ether dinitrile compound, an ether-free trinitrile compound, or an ether trinitrile compound.

In some embodiments, the polynitrile compound contained in the electrolytic solution satisfies at least one of conditions (g) to (j): (g) the ether-free dinitrile compound includes at least one of malononitrile, succinonitrile, glutaronitrile, adiponitrile, pimelonitrile, suberonitrile, azelanitrile, sebaconitrile, methyl malononitrile, ethyl malononitrile, isopropyl malononitrile, tert-butyl malononitrile, methyl succinonitrile, 2-methylene glutaronitrile, 1,4-dicyano-3-butene, 2,2-dimethyl succinonitrile, 2,3-dimethyl succinonitrile, 2,3,3-trimethyl succinonitrile, 2,2,3,3-tetramethyl succinonitrile, 2,3-diethyl-2,3-dimethyl succinonitrile, 2,2-diethyl-3,3-dimethyl succinonitrile, dicyclohexyl-1,1-dicarbonitrile, di cyclohexyl-2, 2-dicarbonitrile, dicyclohexyl-3,3-dicarbonitrile, 2,5-dimethyl-2,5-hexane dicarbonitrile, 2,3-diisobutyl-2,3-dimethyl succinonitrile, 2,2-diisobutyl-3,3-dimethyl succinonitrile, 2-methyl glutaronitrile, 2,3-dimethyl glutaronitrile, 2,4-dimethyl glutaronitrile, 2,2,3,3-tetramethyl glutaronitrile, 2,2,4,4-tetramethyl glutaronitrile, 2,2,3,4-tetramethyl glutaronitrile, 2,3,3,4-tetramethyl glutaronitrile, 1,4-dicyanopentane, 2,6-dicyanoheptane, 2,7-dicyanooctane, 2,8-dicyanononane, 1,6-dicyanodecane, 1,2-dicyanobenzene, 1,3-dicyanobenzene, 1,4-dicyanobenzene, 3,3'-(ethylenedioxy) dipropionitrile, 3,3'-(ethylene disulfide) dipropionitrile, 1,4-dicyano-2-butene, or fumaronitrile.

In some embodiments, the ether dinitrile compound includes:

at least one of (I-1)

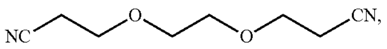

(I-2)

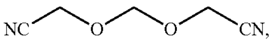

or (I-3)

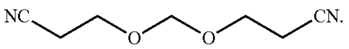

In some embodiments, the ether-free trinitrile compound includes:

at least one of (I-4)

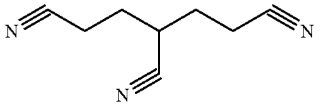

or (I-5)

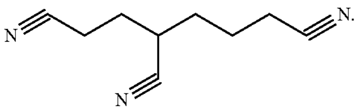

In some embodiments, the ether trinitrile compound includes:

at least one of (I-6)

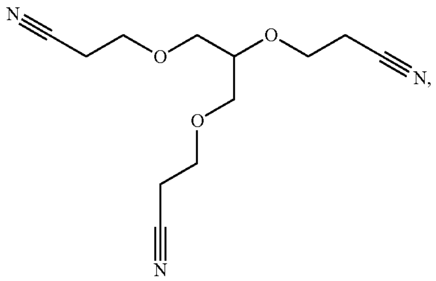

(I-7)

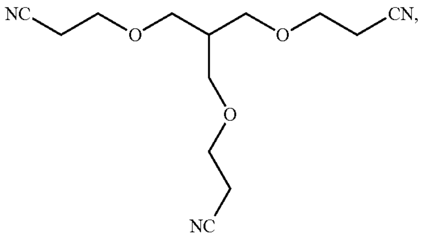

or (I-8)

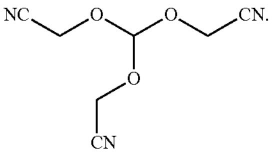

The polynitrile compound can form an effective protection film on the surface of the positive electrode, effectively separate an easily oxidizable component in the electrolytic solution from the surface of the positive electrode, stabilize the positive electrode structure, and reduce dissolution of transition metal of the positive electrode, thereby effectively improving the high-temperature cycle performance and floating charge performance of the electrochemical device.

In some embodiments, based on the total weight of the electrolytic solution, a weight percent of the ether-free dinitrile compound is B %, and $0.0001 \leq B/X \leq 0.02$. In some embodiments, B/X may be approximately 0.0001, approximately 0.00015, approximately 0.00025, approximately 0.0005, approximately 0.0007, approximately 0.0008, approximately 0.0009, approximately 0.001, approximately 0.0011, approximately 0.0015, approximately 0.005, approximately 0.01, approximately 0.02, or may fall within a range formed by any two thereof, for example, approximately 0.0001 to approximately 0.0005, approximately 0.0001 to approximately 0.001, approximately 0.0015 to approximately 0.01, or approximately 0.001 to approximately 0.02. If B/X is too high, the impedance is high, thereby being adverse to improvement of cycle performance and discharge capacity. If B/X is too low, the improvement effect is not obvious.

In some embodiments, the polynitrile compound includes at least an ether-free dinitrile compound, and the ether-free dinitrile compound includes a saturated dinitrile compound and an unsaturated dinitrile compound. The dinitrile compound contains a CN group, and can be complexed with transition metal of the positive electrode to improve the stability of the positive electrode interface under a high voltage. However, the saturated dinitrile compound is of low compatibility with the negative electrode. For example, the dinitrile compound contains an unsaturated bond, and can polymerize on the negative electrode first to form a stable interface film, thereby improving the stability of a negative electrode interface and improving the overall performance. Based on the total weight of the electrolytic solution, a weight percent of the saturated dinitrile compound is Q %, a weight percent of the unsaturated dinitrile compound is V %, and $0.05 \leq V/Q \leq 1$. In some embodiments, V/Q may be approximately 0.05, approximately 0.08, approximately 0.1, approximately 0.15, approximately 0.25, approximately 0.5, approximately 0.75, approximately 1, or may fall within a range formed by any two thereof, for example, approximately 0.05 to approximately 0.5, approximately 0.08 to approximately 1, approximately 0.1 to approximately 0.5, or approximately 0.5 to approximately 1.

In some embodiments, the unsaturated dinitrile compound includes at least one of 2-methylene glutaronitrile, 1,4-dicyano-3-butene, 1,4-dicyano-2-butene, or fumaronitrile.

In some embodiments, the polynitrile compound includes at least an ether dinitrile compound and a trinitrile compound, and the trinitrile compound includes at least one of the ether-free trinitrile compound or the ether trinitrile compound. Based on the total weight of the electrolytic solution, a weight percent of the ether dinitrile compound is H %, a weight percent of the trinitrile compound is G %, and $H/G \leq 2$. In some embodiments, H/G may be approximately 0.1, approximately 0.25, approximately 0.33, approximately 0.5, approximately 1, approximately 1.33, approximately 2, less than or equal to 0.5, less than or equal to 1, or less than or equal to 1.5. The trinitrile compound is mainly adsorbed on the surface of the positive electrode through complexation of CN. During cycling, the CN group is prone to peel off, and the interface is insufficiently protected. Due to a relatively low oxidation potential, the ether dinitrile can oxidize on the surface of the positive electrode to form an interface film, thereby improving the overall performance through a dual protection mechanism.

In some embodiments, the electrolytic solution further includes a film-forming additive. The film-forming additive may include at least one of lithium tetrafluoroborate ($LiBF_4$), ethylene sulfate (DTD), fluoroethylene carbonate (FEC), vinylene carbonate (VC), or 1,3-propane sultone (PS).

In some embodiments, the electrolytic solution further includes a lithium salt. In some embodiments, the lithium salt may include at least one of $LiPF_6$, $LiBF_4$, $LiSO_3F$, $LiN(FSO_2)_2LiCF_3SO_3$, $LiN(FSO_2)(CF_3SO_2)$, $LiN(CF_3SO_2)_2$, or $LiN(C_2F_5SO_2)_2$.

In some embodiments, the electrochemical device includes a negative electrode. The negative electrode includes a negative current collector and a negative active material layer. The negative active material layer includes a negative active material. Specific types of the negative active material are not limited, and may be selected as required. Specifically, the negative active material may include at least one of lithium metal, structured lithium metal, natural graphite, artificial graphite, mesocarbon microbead (MCMB), hard carbon, soft carbon, silicon, a silicon-carbon composite, a Li—Sn alloy, a Li—Sn—O alloy, Sn, SnO, $SnO_2$, spinel-structured lithiated $TiO_2$—$Li_4Ti_5O_{12}$, or a Li—Al alloy.

In some embodiments, the negative active material layer includes a binder. In some embodiments, the binder includes, but is not limited to: polyvinyl alcohol, carboxymethyl cellulose, hydroxypropyl cellulose, diacetyl cellulose, polyvinyl chloride, carboxylated polyvinyl chloride, polyvinyl fluoride, a polymer containing ethylene oxide, polyvinylpyrrolidone, polyurethane, polytetrafluoroethylene, poly(1,1-difluoroethylene), polyethylene, polypropylene, styrene-butadiene rubber, acrylic styrene-butadiene rubber, epoxy resin, or nylon.

In some embodiments, the negative active material layer includes a conductive material. In some embodiments, the conductive material includes, but is not limited to: natural graphite, artificial graphite, carbon black, acetylene black, Ketjen black, carbon fiber, metal powder, metal fiber, copper, nickel, aluminum, silver, or a polyphenylene derivative.

In some embodiments, the negative active material layer may further include a conventional thickener, a filler, or the like.

In some embodiments, the negative current collector includes, but is not limited to: a copper foil, a nickel foil, a stainless steel foil, a titanium foil, foamed nickel, foamed copper, or a polymer substrate coated with a conductive metal.

In some embodiments, the negative electrode further includes a conductive layer. Conductive materials of the conductive layer may include but are not limited to at least one of: a carbon-based material (for example, natural graphite, artificial graphite, carbon black, acetylene black, Ketjen black, carbon fiber, carbon nanotubes, graphene, or the like), a metal-based material (for example, metal powder, metal fiber, or the like, such as copper, nickel, aluminum, silver, and the like), a conductive polymer (for example, a polyphenylene derivative), and any mixture thereof.

In some embodiments, the electrochemical device according to this application has a separator disposed between the positive electrode and the negative electrode to prevent short circuit. The material and the shape of the separator used in the electrochemical device in this application are not particularly limited, and may be based on any technologies disclosed in the prior art. In some embodiments, the separator includes a polymer or an inorganic compound or the like formed from a material that is stable to the electrolytic solution according to this application.

For example, the separator may include a porous substrate and a surface treatment layer. The porous substrate is a non-woven fabric, film or composite film, which, in each case, have a porous structure. The material of the porous substrate is selected from at least one of polyethylene (PE), polypropylene, polyethylene terephthalate, or polyimide. Specifically, the material of the substrate layer may be a polypropylene porous film, a polyethylene porous film, a polypropylene non-woven fabric, a polyethylene non-woven fabric, or a polypropylene-polyethylene-polypropylene porous composite film.

A surface treatment layer is disposed on at least one surface of the porous substrate. The surface treatment layer may be a polymer layer or an inorganic compound layer, or a layer formed by mixing a polymer and an inorganic compound.

The inorganic compound layer includes inorganic particles and a binder. The inorganic particles are selected from a combination of one or more of an aluminum oxide, a silicon oxide, a magnesium oxide, a titanium oxide, a hafnium dioxide, a tin oxide, a ceria, a nickel oxide, a zinc oxide, a calcium oxide, a zirconium oxide, an yttrium oxide, a silicon carbide, a boehmite, an aluminum hydroxide, a magnesium hydroxide, a calcium hydroxide, and a barium sulfate. The binder includes a combination of one or more of a polyvinylidene fluoride, a vinylidene fluoride-hexafluoropropylene copolymer, a polyamide, a polyacrylonitrile, a polyacrylate, a polyacrylic acid, a polyacrylate, a polyvinylpyrrolidone, a polyvinyl ether, a poly methyl methacrylate, a polytetrafluoroethylene, and a polyhexafluoropropylene. The polymer layer includes a polymer, and the material of the polymer includes at least one of polyamide, polyacrylonitrile, acrylate polymer, polyacrylic acid, polyacrylate, polyvinylpyrrolidone, polyvinyl ether, polyvinylidene fluoride, or poly(vinylidene fluoride-hexafluoropropylene).

In some embodiments, the electrochemical device according to this application is a lithium-ion battery. The positive electrode of the lithium-ion battery includes a positive current collector and a positive active material layer coated on the positive current collector. The negative electrode includes a negative current collector and a negative active material layer coated on the negative current collector.

In some embodiments, the electrochemical device according to this application is a high-voltage rechargeable lithium-ion battery. The high-voltage rechargeable lithium-ion battery includes a negative electrode, a positive electrode, an electrolytic solution, and a separator.

II. Electronic Device

The electrochemical device described in this application is applicable to electronic devices in various fields.

The electrochemical device according to this application may be used for purposes not particularly limited, and may be used for any purpose known in the prior art. In an embodiment, the electrochemical device according to this application is applicable to, but without limitation: a notebook computer, a pen-inputting computer, a mobile computer, an e-book player, a portable phone, a portable fax machine, a portable photocopier, a portable printer, a stereo headset, a video recorder, a liquid crystal display television set, a handheld cleaner, a portable CD player, a mini CD-ROM, a transceiver, an electronic notepad, a calculator, a memory card, a portable voice recorder, a radio, a backup power supply, a motor, a car, a motorcycle, a power-assisted bicycle, a bicycle, a lighting appliance, a toy, a game machine, a watch, an electric tool, a flashlight, a camera, a large household battery, a lithium-ion capacitor, and the like.

III. Embodiments

The following describes this application in further detail with reference to embodiments and comparative embodiments. However, to the extent not departing from the essence of this application, this application is not limited to such embodiments.

Preparing a Lithium-Ion Battery (1) Preparing a Negative Electrode

Stirring and mixing graphite as a negative active material, styrene butadiene rubber (SBR), and sodium carboxymethyl cellulose (CMC) thoroughly in an appropriate amount of deionized water solvent at a weight ratio of 97.4:1.2:1.4 to form a homogeneous negative slurry, coating a copper foil as a negative current collector with the slurry, drying and cold-calendering the copper foil, and welding tabs to obtain a negative electrode.

(2) Preparing an Electrolytic Solution

Mixing ethylene carbonate (EC), propylene carbonate (PC), and diethyl carbonate (DEC) at a mass ratio of 1:1:1 in an argon atmosphere glovebox in which the water content is less than 10 ppm, and then adding carboxylate and mixing evenly, dissolving a well dried lithium salt $LiPF_6$ in the foregoing nonaqueous solvent, adding 5 wt % fluoroethylene carbonate, and finally adding an additive in a given weight percent to prepare the electrolytic solution disclosed in the embodiment. Based on the total weight of the electrolytic solution, the weight percent of $LiPF_6$ is 14%. The carboxylate and the additive in the embodiments and comparative embodiments as well as the weight percent thereof are shown in the following table.

(3) Preparing a Positive Electrode

Stirring and mixing Mg-containing lithium cobaltate, acetylene black, and polyvinylidene difluoride at a weight ratio of 96:2:2 thoroughly in an appropriate amount of N-methyl-pyrrolidone (NMP) solvent to form a homogeneous positive slurry. Coating an aluminum foil as a positive current collector with the slurry, drying and cold-calendering the aluminum foil, and welding tabs to obtain a positive electrode. Based on the total weight of the positive active material, the content of the Mg element is shown in the following table.

(4) Preparing a Separator

Using a PE porous polymer film as a separator.

(5) Preparing a Lithium-Ion Battery

Stacking the positive electrode, the separator, and the negative electrode in sequence, letting the separator be located between the positive electrode and the negative electrode to serve a separation function, winding them to obtain a bare cell, placing the bare cell into an outer package foil made of an aluminum plastic film, injecting the prepared electrolytic solution into the cell that is dried, and performing steps such as vacuum sealing, static standing, chemical formation, and shaping to complete preparing a lithium-ion battery.

Performing the foregoing preparation method to prepare the lithium-ion batteries disclosed in Embodiments 1 to 48 and Comparative Embodiments 1 to 2, and performing the following test on the prepared batteries. The compacted densities of the positive active material layers in Embodiments 1 to 45 are the same, and the compacted densities of the positive active material layers in Embodiments 2 and 46 to 48 are shown in Table 5.

Test Methods (1) High-Temperature Cycle Test

Putting the prepared lithium-ion battery into a 45° C. thermostat, charging the battery at a constant current of 1.5 C until the voltage reaches 4.4 V, charging the battery at a constant voltage of 4.4 V until the current reaches 0.05 C, and discharging the battery at a constant current of 1.0 C until the voltage reaches 3.0 V, thereby completing a charge and discharge cycle. Repeating the foregoing test process to complete 500 charge and discharge cycles, and monitoring an initial discharge capacity and a remaining discharge capacity that remains after 500 cycles. High-temperature capacity retention rate=remaining discharge capacity/initial discharge capacity×100%.

(2) Low-Temperature Discharge Test

Putting the prepared lithium-ion battery into a high/low temperature thermostat, adjusting the temperature to 25° C., charging the battery at a constant current of 0.7 C until the voltage reaches 4.4 V, charging the battery at a constant voltage of 4.4 V until the current reaches 0.05 C, and then discharging the battery at a constant current of 0.2 C until the voltage reaches 3.0 V, and recording the discharge capacity at this time as D0. Then charging the battery at a constant current of 0.7 C until the voltage reaches 4.4 V, charging the battery at a constant voltage of 4.4 V until the current reaches 0.05 C, adjusting the temperature of the high/low temperature thermostat to −10° C., keeping the battery standing for 1 hour after the temperature gets steady, and then discharging the battery at a constant current of 0.2 C until the voltage reaches 3.0 V, and recording the discharge capacity at this time as D1. Low-temperature discharge capacity retention rate=(D1/D0)×100%.

(3) Testing Dn and Dv of Particles of the Positive Active Material

Disassembling the lithium-ion battery after discharging, taking out the positive active material in the positive active material layer, and performing a particle size distribution test with a particle size analyzer.

(4) Testing the Content of the Mg and M1 Elements in the Positive Active Material Disassembling the lithium-ion battery after discharging, and performing an inductively coupled plasma (ICP) test on the positive active material in the positive active material layer.

(5) Testing the Content of the M2 Element in the Positive Active Material Layer

Disassembling the lithium-ion battery after discharging, performing a surface energy dispersive spectroscopy (EDS) test on the positive active material layer, magnifying a test region on a scale of 1:3000, and performing EDS scanning across the entire region.

(6) Testing the Content of Ingredients in the Electrolytic Solution

Centrifuging the lithium-ion battery after discharging, performing a gas chromatography mass spectrometry (GC-MS) test on the liquid obtained through the centrifugation, and measuring the weight percent of each ingredient.

(7) Testing the Specific Surface Area of the Positive Active Material (BET)

Taking an electrode plate of a given weight, drying the electrode plate in a ventilating cabinet at a normal temperature for 24 hours, and then performing a Brunauer-Emmett-Teller (BET) test. Measuring the specific surface area by a gas adsorption BET method with reference to the national standard GB/T 19587-2017.

(8) Testing the Compacted Density of the Positive Active Material Layer

The compacted density of the positive active material is obtained by the following method: Selecting a region of a specific area from the positive electrode plate, and using a precise measurement instrument such as a micrometer to measure the thickness, area, and weight of the positive electrode plate; and calculating the compacted density by the following formula:

Compacted density=(weight of the positive electrode plate−weight of the positive current collector)/(area of the positive electrode plate×(thickness of the positive electrode plate−thickness of the positive current collector)).

The weight unit of the positive electrode plate is mg; the area unit of the positive electrode plate is $mm^2$; and the thickness unit of the positive electrode plate is mm.

The weight of the positive electrode plate is the weight of a dried positive electrode plate without the electrolytic solution.

Test Results

Table 1 shows parameters and test results of the lithium-ion battery in Embodiments 1 to 15 and Comparative Embodiments 1 to 2. In the embodiments and comparative embodiments shown in Table 1, the weight percent of the F element in the positive active material layer is 4%, and the weight percent of the P element is 0.3%.

TABLE 1

| | Carboxylate | | $Dn_{50}$ | | Mg (X | | High-temperature cycle capacity retention | Low-temperature discharge capacity retention |
|---|---|---|---|---|---|---|---|---|
| | Compound | Y % | (A μm) | A/Y | ppm) | X/Y | rate | rate |
| Embodiment 1 | Ethyl propionate | 4 | 25 | 6.25 | 500 | 125 | 66.40% | 59.30% |
| Embodiment 2 | Ethyl propionate | 30 | 17 | 0.57 | 2550 | 85 | 68.70% | 63.70% |
| Embodiment 3 | Ethyl propionate | 20 | 15 | 0.75 | 2550 | 127.5 | 70.20% | 62.40% |
| Embodiment 4 | Ethyl propionate | 35 | 15 | 0.43 | 2550 | 72.9 | 68.50% | 64.10% |
| Embodiment 5 | Ethyl propionate | 40 | 15 | 0.375 | 2550 | 63.7 | 68.30% | 64.60% |
| Embodiment 6 | Ethyl propionate + propyl propionate | 15 + 15 | 15 | 0.5 | 7500 | 250 | 68.20% | 63.20% |

TABLE 1-continued

| | Carboxylate Compound | Y % | $Dn_{50}$ (A μm) | A/Y | Mg (X ppm) | X/Y | High-temperature cycle capacity retention rate | Low-temperature discharge capacity retention rate |
|---|---|---|---|---|---|---|---|---|
| Embodiment 7 | Propyl propionate | 60 | 2.4 | 0.04 | 7500 | 125 | 67.10% | 61.90% |
| Embodiment 8 | Ethyl propionate + ethyl acetate | 50 + 10 | 15 | 0.25 | 300 | 5 | 65.60% | 62.20% |
| Embodiment 9 | Ethyl propionate + propyl propionate | 5 + 10 | 15 | 1 | 2500 | 166.7 | 68.10% | 63.20% |
| Embodiment 10 | Ethyl propionate + propyl propionate | 5 + 10 | 15 | 1 | 2000 | 133.3 | 67.90% | 62.90% |
| Embodiment 11 | Ethyl propionate + propyl propionate | 5 + 10 | 15 | 1 | 4000 | 266.7 | 68.40% | 62.30% |
| Embodiment 12 | Ethyl propionate | 5 | 15 | 3 | 30000 | 6000 | 64.1% | 58.3% |
| Embodiment 13 | Ethyl acetate | 10 | 15 | 1.5 | 3000 | 300 | 67.30% | 64.10% |
| Embodiment 14 | Ethyl propionate | 60 | 2.1 | 0.035 | 7500 | 125 | 57.30% | 49.30% |
| Embodiment 15 | Ethyl propionate | 4 | 25.2 | 6.3 | 500 | 125 | 59.40% | 51.30% |
| Comparative Embodiment 1 | Ethyl acetate | 5 | 15 | 3 | 20 | 4 | 30.10% | 45.10% |
| Comparative Embodiment 2 | Ethyl acetate | 5 | 15 | 3 | 30500 | 6100 | 32.20% | 47.20% |

As can be seen from Embodiments 1 to 15 and Comparative Embodiments 1 to 2 in Table 1, when the lithium-ion battery satisfies 5≤X/Y≤6000, the high-temperature cycle capacity retention rate and the low-temperature discharge capacity retention rate of the lithium-ion battery are relatively high. When the lithium-ion battery further satisfies 0.04≤A/Y≤25, the lithium-ion battery achieves higher performance.

The carboxylate can reduce the impedance and improve the low-temperature performance, but is of low interface stability and is prone to cause a structural rupture. The dopant element Mg in the positive electrode can occupy the site of lithium after the positive electrode is delithiated, so as to stabilize the positive electrode structure, alleviate structural distortion during cycling, and improve overall performance. The lithium cobaltate particles have a specific particle size. The transmission path of small-particle lithium ions is short, and can improve the high-temperature stability of the system while ensuring excellent low-temperature performance.

Table 2 shows the parameters and test results of the lithium-ion battery in Embodiment 2 and Embodiments 16 to 24. A and X are the same between Embodiments 16 to 24 and Embodiment 2, and differences are shown in Table 2. In the embodiments shown in Table 2, the weight percent of the F element in the positive active material layer is 4%, and the weight percent of the P element is 0.3%.

TABLE 2

| | Carboxylate Compound | Y % | Specific surface area (C $m^2/g$) | C/Y | $Dv_{10}/Dn_{10}$ (Z) | High-temperature cycle capacity retention rate | Low-temperature discharge capacity retention rate |
|---|---|---|---|---|---|---|---|
| Embodiment 2 | Ethyl propionate | 30 | 0.12 | 0.004 | 5.5 | 68.70% | 63.70% |
| Embodiment 16 | Ethyl propionate | 30 | 0.24 | 0.008 | 5.5 | 69.50% | 65.40% |
| Embodiment 17 | Ethyl propionate | 4 | 0.40 | 0.10 | 5.5 | 69.10% | 64.10% |
| Embodiment 18 | Ethyl propionate | 30 | 0.24 | 0.008 | 1.5 | 68.90% | 66.20% |
| Embodiment 19 | Ethyl propionate | 30 | 0.24 | 0.008 | 11 | 68.70% | 66.10% |
| Embodiment 20 | Ethyl propionate | 30 | 0.09 | 0.003 | 5.5 | 63.40% | 60.60% |
| Embodiment 21 | Ethyl propionate | 5 | 0.60 | 0.12 | 5.5 | 62.90% | 61.20% |

TABLE 2-continued

| | Carboxylate | | Specific surface area (C | | | High-temperature cycle capacity retention | Low-temperature discharge capacity retention |
|---|---|---|---|---|---|---|---|
| | Compound | Y % | $m^2/g$) | C/Y | $Dv_{10}/Dn_{10}$ (Z) | rate | rate |
| Embodiment 22 | Ethyl propionate | 30 | 0.24 | 0.008 | 1.4 | 61.30% | 59.70% |
| Embodiment 23 | Ethyl propionate | 30 | 0.24 | 0.008 | 12 | 62.20% | 60.60% |
| Embodiment 24 | Ethyl propionate | 60 | 0.18 | 0.003 | 1.4 | 52.60% | 56.30% |

As can be seen from comparison between Embodiment 24 and Embodiments 16 to 23, when the lithium-ion battery further satisfies $0.004 \leq C/Y \leq 0.1$ or $1.5 \leq Z \leq 11$, the lithium-ion battery achieves better high-temperature cycle performance and low temperature discharge performance.

The specific surface area of the positive active material affects the contact with the electrolytic solution. The larger the specific surface area, the wider the area of contact with the electrolytic solution, and the more likely the side reactions are to occur. The use of the carboxylate of a lower content helps to obtain a more stable system and improves cycle performance. However, the low-temperature discharge performance is affected by the lower content of the carboxylate. Therefore, the content of the carboxylate and the specific surface area need to satisfy a specific relationship.

The transmission path of lithium ions of small-particle lithium cobaltate is relatively short, and the small-particle lithium cobaltate achieves excellent low-temperature performance. Too small and too large particle sizes affect processing. Therefore, the particle size and the particle size distribution need to satisfy a specific relationship to achieve optimal overall performance.

Table 3 shows the parameters and test results of the lithium-ion battery in Embodiment 16, Embodiment 24, and Embodiments 25 to 32. A, X, Y, and C are the same between Embodiments 25 to 29 and Embodiment 24; A, X, Y, and C are the same between Embodiments 30 to 32 and Embodiment 16, and differences are shown in Table 3.

TABLE 3

| | M1 element | | M2 element | | | | High-temperature cycle | Low-temperature discharge |
|---|---|---|---|---|---|---|---|---|
| | M1 element | Weight percent D (ppm) | M2 element | Weight percent (%) | $Dv_{10}$ | $Dn_{10}$ | capacity retention rate | capacity retention rate |
| Embodiment 16 | / | / | F + P | 4 + 0.3 | 3.2 | 0.58 | 69.50% | 65.40% |
| Embodiment 24 | / | / | F + P | 4 + 0.3 | 2.25 | 1.60 | 52.60% | 56.30% |
| Embodiment 25 | Al | 2000 | F + P | 4 + 0.3 | 2.25 | 1.60 | 57.50% | 59.80% |
| Embodiment 26 | Al | 2000 | F + P | 6 + 0.3 | 2.2 | 0.4 | 60.8% | 61.60% |
| Embodiment 27 | Al + Ti | 2000 + 1000 | F + P | 6 + 0.3 | 2.5 | 0.45 | 63.10% | 65.70% |
| Embodiment 28 | Al + Ti + Zr | 2000 + 1000 + 2000 | F + P | 6 + 0.3 | 3 | 0.54 | 63.30% | 61.50% |
| Embodiment 29 | Al + Ti + Zr | 1000 + 600 + 700 | F + P | 6 + 0.3 | 3.5 | 0.64 | 70.10% | 65.40% |
| Embodiment 30 | Al + Ti + Zr | 2000 + 1000 + 2000 | F + P | 1 + 0.1 | 4 | 0.73 | 69.70% | 65.90% |
| Embodiment 31 | Al + Ti + Zr | 2000 + 1000 + 2000 | F + P | 5 + 0.5 | 4.1 | 0.75 | 71.10% | 65.70% |
| Embodiment 32 | Al + Ti + Zr | 2000 + 1000 + 2000 | F + P | 15 + 0.1 | 4.2 | 0.75 | 69.60% | 65.30% |

As can be seen from Table 3, an M1 element (for example, Al, Ti, and Zr) is further added into the positive active material to further stabilize the positive electrode structure and improve the high-temperature cycle performance of the electrochemical device. In addition, the surface of the positive active material further contains an M2 element (for example, F, and P) to further stabilize the positive electrode interface and improve the high-temperature cycle performance of the lithium-ion battery.

The M1 element has a strong bonding energy for bonding with oxygen, and can stabilize the oxygen after the positive electrode is delithiated, thereby alleviate the structural distortion during the cycling and improving the performance. However, when the content of the element is too high, the exertion of the capacity of the lithium cobaltate will be affected drastically, and the cycle capacity will be affected adversely.

The M2 element exists on the surface of the positive active material layer, and is conducive to isolating the electrolytic solution from the positive electrode material and protecting the positive electrode. However, when the content of the element is too high, polarization will be severer, and cycle performance will be affected adversely.

Table 4 shows the parameters and test results of the lithium-ion battery in Embodiment 2, Embodiment 16, and Embodiments 33 to 45. A, Y, C, and Z are the same between Embodiments 33 to 45 and Embodiment 16, and differences are shown in Table 4.

TABLE 4

| | Mg | Ether-free dinitrile compound (B %) | | | | | | Ether dinitrile compound | | Trinitrile compound | | | High-temperature cycle capacity |
|---|---|---|---|---|---|---|---|---|---|---|---|---|---|
| | X (ppm) | Saturated dinitrile | Q % | Unsaturated dinitrile | V % | B/X | V/Q | Chemical formula | H % | Chemical formula | G % | H/G | retention rate |
| Embodiment 16 | 2550 | / | / | / | / | / | / | / | / | / | / | / | 69.50% |
| Embodiment 2 | 2550 | / | / | / | / | / | / | / | / | / | / | / | 68.70% |
| Embodiment 33 | 2000 | Succinonitrile | 0.5 | / | / | 0.00025 | / | I-1 | 1 | I-5 | 0.5 | 2.00 | 71.10% |
| Embodiment 34 | 2000 | Glutaronitrile | 2 | / | / | 0.00100 | / | I-1 | 2 | I-5 | 1.5 | 1.33 | 71.40% |
| Embodiment 35 | 2000 | Adiponitrile | 3 | / | / | 0.00150 | / | I-2 | 0.5 | I-5 | 2 | 0.25 | 71.70% |
| Embodiment 36 | 3000 | Pimelonitrile | 3 | / | / | 0.00100 | / | I-3 | 0.5 | I-6 | 1 | 0.50 | 71.30% |
| Embodiment 37 | 400 | 2-methyl glutaronitrile + succinonitrile + adiponitrile | 2 + 3 + 3 | / | / | 0.02000 | / | I-1 | 0.5 | I-6 | 2 | 0.25 | 71.60% |
| Embodiment 38 | 3000 | Succinonitrile | 2.0 | 2-methylene glutaronitrile | 0.3 | 0.0008 | 0.15 | / | / | / | / | / | 70.20% |
| Embodiment 39 | 3000 | Adiponitrile | 3.0 | 1,4-dicyano-2-butene | 0.3 | 0.0011 | 0.10 | / | / | / | / | / | 71.30% |
| Embodiment 40 | 3000 | Adiponitrile | 3.0 | Fumaronitrile | 0.3 | 0.0011 | 0.10 | / | / | / | / | / | 70.80% |
| Embodiment 41 | 3000 | Succinonitrile | 2.0 | 1,4-dicyano-2-butene | 0.1 | 0.0007 | 0.05 | / | / | / | / | / | 70.60% |
| Embodiment 42 | 3000 | Succinonitrile | 1.0 | 1,4-dicyano-2-butene | 1.0 | 0.00067 | 1.00 | / | / | / | / | / | 70.50% |
| Embodiment 43 | 3000 | Succinonitrile | 2.0 | 1,4-dicyano-2-butene | 0.2 | 0.00073 | 0.1 | I-1 | 0.5 | I-5 | 1.5 | 0.33 | 73.30% |
| Embodiment 44 | 3000 | Adiponitrile | 2.0 | 1,4-dicyano-3-butene | 0.2 | 0.00073 | 0.1 | I-1 | 0.5 | I-6 | 2 | 0.25 | 73.70% |
| Embodiment 45 | 3000 | Adiponitrile | 2.5 | 1,4-dicyano-3-butene | 0.2 | 0.0009 | 0.08 | I-1 | 0.5 | I-6 | 2 | 0.25 | 73.40% |

As can be seen from Table 4, the electrolytic solution that further contains a polynitrile compound can further improve the high-temperature cycle performance of the electrochemical device.

Too high content of the unsaturated dinitrile will lead to a too high impedance of the negative electrode, aggravate polarization, and adversely affect cycling. Too low content of the unsaturated dinitrile will lead to insufficient protection for the negative electrode. The saturated dinitrile is significantly incompatible with the negative electrode, and unable to achieve the optimal performance. Therefore, the weight percent of the saturated dinitrile compound and the unsaturated dinitrile compound in the electrolytic solution is adjusted to satisfy $0.05 \leq V/Q \leq 1$ to achieve excellent performance of the lithium-ion battery.

Table 5 shows the compacted density and test results of the positive active material layer in Embodiment 2 and Embodiments 46 to 48. The parameters such as A, Y, X, C, and Z are the same between Embodiments 46 to 48 and Embodiment 2.

TABLE 5

| | Compacted density of the positive active material layer ($g/cm^3$) | High-temperature cycle capacity retention rate | Low-temperature discharge capacity retention rate |
|---|---|---|---|
| Embodiment 2 | 4.15 | 68.70% | 63.70% |
| Embodiment 46 | 3.95 | 63.1% | 60.3% |
| Embodiment 47 | 4.23 | 67.9% | 62.3% |
| Embodiment 48 | 4.32 | 65.4% | 60.1% |

As can be seen from Table 5, when the compacted density of the positive active material layer is greater than or equal to 4.0 $g/cm^3$, the energy density, the high-temperature cycle performance, and the low-temperature discharge performance of the electrochemical device can reach an optimized state.

When the compacted density of the positive active material layer is less than 4.0 $g/cm^3$, the contact area between particles becomes larger, and electron transmission is worsened, thereby being adverse to cycling.

The foregoing description is merely several embodiments of this application, and is not intended to limit this application in any form. Although this application is disclosed above with reference to the exemplary embodiments, the exemplary embodiments are not intended to limit this application. Any modifications or improvements, which may be made by a person skilled in the art by using the foregoing technical content without departing from the scope of the technical solutions of this application, are treated as equivalents of this application, and fall within the scope of the technical solutions of this application.

References to "embodiments", "some embodiments", "an embodiment", "another example", "example", "specific example" or "some examples" throughout the specification mean that at least one embodiment or example in this application includes specific features, structures, materials, or characteristics described in the embodiment(s) or example(s). Therefore, descriptions throughout the specification, which make references by using expressions such as "in some embodiments", "in an embodiment", "in one embodiment", "in another example", "in an example", "in a specific example", or "example", do not necessarily refer to the same embodiment or example in this application. In addition, specific features, structures, materials, or characteristics herein may be combined in one or more embodiments or examples in any appropriate manner.

Although illustrative embodiments have been demonstrated and described above, a person skilled in the art understands that the above embodiments are not to be construed as a limitation on this application, and changes, replacements, and modifications may be made to the embodiments without departing from the spirit, principles, and scope of this application.

What is claimed is:

1. An electrochemical device, comprising a positive electrode and an electrolytic solution, wherein the positive electrode comprises a positive current collector and a positive active material layer disposed on at least one surface of the positive current collector, wherein the positive active material layer comprises a positive active material, the positive active material contains an Mg element, and, based on a total weight of the positive active material, a weight of the Mg element is X ppm, and $300 \leq X \leq 30000$;

the electrolytic solution comprises a carboxylate and a polynitrile compound;

based on a total weight of the electrolytic solution, a weight percent of the carboxylate is Y %, and $Y \leq 60$; $5 \leq X/Y \leq 6000$;

the polynitrile compound comprises an ether-free dinitrile compound;

the ether-free dinitrile compound comprises a saturated ether-free dinitrile compound and an unsaturated ether-free dinitrile compound; and based on the total weight of the electrolytic solution, a weight percent of the saturated ether-free dinitrile compound is Q %, a weight percent of the unsaturated ether-free dinitrile compound is V %, and $0.05 \leq V/Q \leq 1$.

2. The electrochemical device according to claim 1, wherein $100 \leq X/Y \leq 500$.

3. The electrochemical device according to claim 1, wherein $Dn_{50}$ of particles of the positive active material is A μm, $2 \leq A \leq 25$, and $0.04 < A/Y \leq 6.25$, wherein $Dn_{50}$ is a particle size when a cumulative number distribution percentage of particles of the positive active material reaches 50%.

4. The electrochemical device according to claim 1, wherein the positive active material satisfies at least one of conditions (a) to (d):

(a) a specific surface area of the positive active material is C $m^2/g$, wherein C is the specific surface area of the positive active material as measured by a Brunauer-Emmett-Teller (BET) method, and $0.004 \leq C/Y \leq 0.1$;

(b) $Dv_{10}/Dn_{10}$ of the particles of the positive active material is Z, wherein $Dv_{10}$ is a particle size at which a cumulative volume distribution of the particles reaches 10%, and wherein $Dn_{10}$ is a particle size at which a cumulative number distribution of the particles reaches 10%, and $1.5 \leq Z \leq 11$;

(c) the positive active material further comprises an M1 element, and the M1 element comprises at least one of Al, Mo, Zr, Ti, Fe, V, Cr, Ba, Sr, or Nb; or (d) the positive active material layer comprises an M2 element, and the M2 element comprises at least one of F, B, Cl, S, or P.

5. The electrochemical device according to claim 1, wherein particles of the positive active material satisfy at least one of condition (e) or condition (f):

(e) $Dv_{10}$ of the particles of the positive active material falls within a range of 2.2 μm to 4.1 μm, wherein $Dv_{10}$ is a particle size at which a cumulative volume distribution of the particles reaches 10%; or (f) $Dn_{10}$ of the particles of the positive active material falls within a range of 0.35 μm to 1.4 μm, wherein $Dn_{10}$ is a particle size at which a cumulative number distribution of the particles reaches 10%.

6. The electrochemical device according to claim 1, wherein a compacted density of the positive active material layer is greater than or equal to 4.0 $g/cm^3$.

7. The electrochemical device according to claim 1, wherein the carboxylate comprises at least one of ethyl acetate, propyl acetate, ethyl propionate, methyl propionate, propyl propionate, butyl propionate, pentyl propionate, ethyl butyrate, butyl butyrate, propyl butyrate, or pentyl butyrate.

8. The electrochemical device according to claim 1, wherein the electrolytic solution satisfies at least one of conditions (g) to (j):

(g) the electrolytic solution comprises the ether-free dinitrile compound; and the ether-free dinitrile compound comprises at least one of malononitrile, succinonitrile, glutaronitrile, adiponitrile, pimelonitrile, suberonitrile, azelanitrile, sebaconitrile, methyl malononitrile, ethyl malononitrile, isopropyl malononitrile, tert-butyl malononitrile, methyl succinonitrile, 2-methylene glutaronitrile, 1,4-dicyano-3-butene, 2,2-dimethyl succinonitrile, 2,3-dimethyl succinonitrile, 2,3,3-trimethyl succinonitrile, 2,2,3,3-tetramethyl succinonitrile, 2,3-diethyl-2,3-dimethyl succinonitrile, 2,2-diethyl-3,3-dimethyl succinonitrile, dicyclohexyl-1,1-dicarbonitrile, dicyclohexyl-2, 2-dicarbonitrile, dicyclohexyl-3,3-dicarbonitrile, 2,5-dimethyl-2,5-hexane dicarbonitrile, 2,3-diisobutyl-2,3-dimethyl succinonitrile, 2,2-diisobutyl-3,3-dimethyl succinonitrile, 2-methyl glutaronitrile, 2,3-dimethyl glutaronitrile, 2,4-dimethyl glutaronitrile, 2,2,3,3-tetramethyl glutaronitrile, 2,2,4,4-tetramethyl glutaronitrile, 2,2,3,4-tetramethyl glutaronitrile, 2,3,3,4-tetramethyl glutaronitrile, 1,4-dicyanopentane, 2,6-dicyanoheptane, 2,7-dicyanooctane, 2,8-dicyanononane, 1,6-dicyanodecane, 1,2-dicyanobenzene, 1,3-dicyanobenzene, 1,4-dicyanobenzene, 3,3'-(ethylenedioxy) dipropionitrile, 3,3'-(ethylene disulfide) dipropionitrile, 1,4-dicyano-2-butene, or fumaronitrile;

(h) the electrolytic solution comprises an ether dinitrile compound; and the ether dinitrile compound comprises:

at least one of

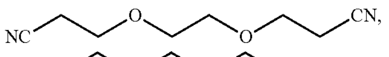

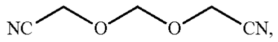
or

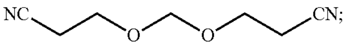

(i) the electrolytic solution comprises an ether-free trinitrile compound; and the ether-free trinitrile compound comprises:

at least one of

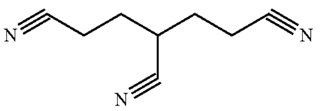
or

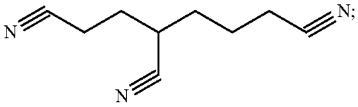

and (j) the electrolytic solution comprises an ether trinitrile compound; and the ether trinitrile compound comprises at least one of

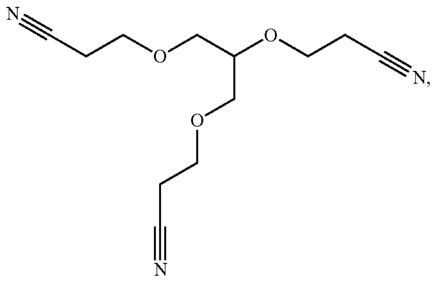

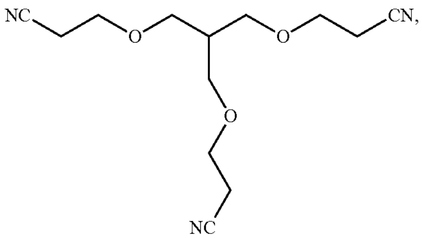
or

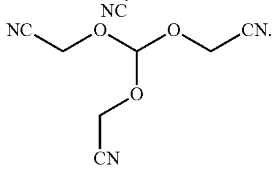

9. The electrochemical device according to claim 1, wherein; the electrolytic solution comprises the ether-free dinitrile compound; based on the total weight of the electrolytic solution, a weight percent of the ether-free dinitrile compound is B, and $0.0001 \leq B/X \leq 0.02$, wherein B is a weight percent (wt %) of the ether-free dinitrile compound based on the total weight of the electrolytic solution, and wherein X is expressed in ppm based on the total weight of the positive active material as recited in claim 1.

10. The electrochemical device according to claim 9, wherein $0.001 \leq B/X \leq 0.01$.

11. The electrochemical device according to claim 1, wherein the polynitrile compound comprises an ether dinitrile compound and a trinitrile compound; wherein the trinitrile compound is selected from an ether-free trinitrile compound and an ether trinitrile compound;

wherein, based on the total weight of the electrolytic solution, a weight percent of the ether dinitrile compound is H %, a weight percent of the trinitrile compound is G %, and $H/G \leq 2$.

12. The electrochemical device according to claim 11, wherein $0.25 \leq H/G \leq 1.33$.

13. The electrochemical device according to claim 1, wherein $0.08 \leq V/Q \leq 0.75$.

14. An electronic device, wherein the electronic device comprises an electrochemical device, wherein the electrochemical device comprises a positive electrode and an electrolytic solution, wherein the positive electrode comprises a positive current collector and a positive active material layer disposed on at least one surface of the positive current collector, wherein the positive active material layer comprises a positive active material, the positive active material contains an Mg element, and, based on a total weight of the positive active material, a weight of the Mg element is X ppm, and $300 \leq X \leq 30000$;

the electrolytic solution comprises a carboxylate and a polynitrile compound;

based on a total weight of the electrolytic solution, a weight percent of the carboxylate is Y %, and Y≤60; 5≤X/Y≤6000;

the polynitrile compound comprises an ether-free dinitrile compound;

the ether-free dinitrile compound comprises a saturated ether-free dinitrile compound and an unsaturated ether-free dinitrile compound; and based on the total weight of the electrolytic solution, a weight percent of the saturated ether-free dinitrile compound is Q %, a weight percent of the unsaturated ether-free dinitrile compound is V %, and 0.05≤V/Q≤1.

15. The electronic device according to claim 14, wherein the electrolytic solution satisfies at least one of conditions (g) to (j):

(g) the electrolytic solution comprises the ether-free dinitrile compound; and the ether-free dinitrile compound comprises at least one of malononitrile, succinonitrile, glutaronitrile, adiponitrile, pimelonitrile, suberonitrile, azelanitrile, sebaconitrile, methyl malononitrile, ethyl malononitrile, isopropyl malononitrile, tert-butyl malononitrile, methyl succinonitrile, 2-methylene glutaronitrile, 1,4-dicyano-3-butene, 2,2-dimethyl succinonitrile, 2,3-dimethyl succinonitrile, 2,3,3-trimethyl succinonitrile, 2,2,3,3-tetramethyl succinonitrile, 2,3-diethyl-2,3-dimethyl succinonitrile, 2,2-diethyl-3,3-dimethyl succinonitrile, dicyclohexyl-1,1-dicarbonitrile, dicyclohexyl-2, 2-dicarbonitrile, dicyclohexyl-3,3-dicarbonitrile, 2,5-dimethyl-2,5-hexane dicarbonitrile, 2,3-diisobutyl-2,3-dimethyl succinonitrile, 2,2-diisobutyl-3,3-dimethyl succinonitrile, 2-methyl glutaronitrile, 2,3-dimethyl glutaronitrile, 2,4-dimethyl glutaronitrile, 2,2,3,3-tetramethyl glutaronitrile, 2,2,4,4-tetramethyl glutaronitrile, 2,2,3,4-tetramethyl glutaronitrile, 2,3,3,4-tetramethyl glutaronitrile, 1,4-dicyanopentane, 2,6-dicyanoheptane, 2,7-dicyanooctane, 2,8-dicyanononane, 1,6-dicyanodecane, 1,2-dicyanobenzene, 1,3-dicyanobenzene, 1,4-dicyanobenzene, 3,3'-(ethylenedioxy) dipropionitrile, 3,3'-(ethylene disulfide) dipropionitrile, 1,4-dicyano-2-butene, or fumaronitrile;

(h) the electrolytic solution comprises an ether dinitrile compound; and the ether dinitrile compound comprises:

at least one of

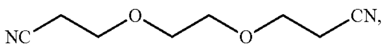
,
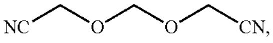
, or
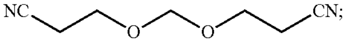
;

(i) the electrolytic solution comprises an ether-free trinitrile compound; and the ether-free trinitrile compound comprises:

at least one of

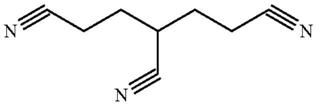
or

-continued

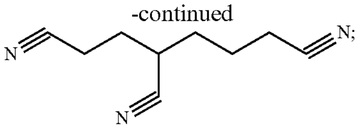
;

and (j) the electrolytic solution comprises an ether trinitrile compound; and the ether trinitrile compound comprises:

at least one of

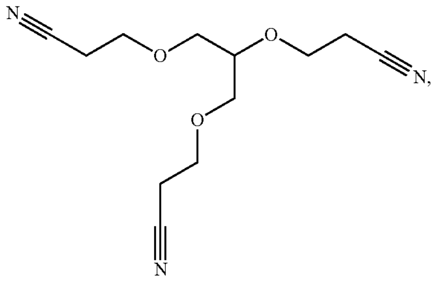
,
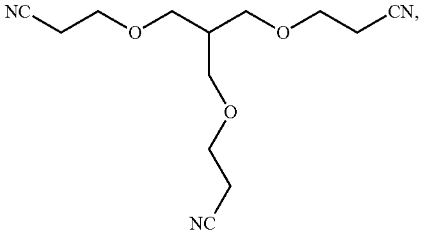
, or
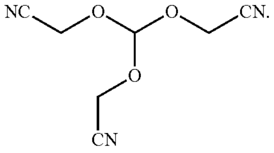
.

16. The electronic device according to claim 14, wherein the electrolytic solution comprises the ether-free dinitrile compound; based on the total weight of the electrolytic solution, a weight percent of the ether-free dinitrile compound is B, and 0.0001≤B/X≤0.02, wherein B is a weight percent (wt %) of the ether-free dinitrile compound based on the total weight of the electrolytic solution, and wherein X is expressed in ppm based on the total weight of the positive active material as recited in claim 14.

17. The electronic device according to claim 14, wherein the polynitrile compound comprises an ether dinitrile compound and a trinitrile compound, wherein the trinitrile compound is selected from an ether-free trinitrile compound and an ether trinitrile compound, wherein, based on the total weight of the electrolytic solution, a weight percent of the ether dinitrile compound is H %, a weight percent of the trinitrile compound is G %, and H/G≤2.

18. The electronic device according to claim 17, wherein 0.25≤H/G≤1.33.

19. The electrochemical device according to claim 1, wherein 300≤X≤4000.

20. The electrochemical device according to claim 7, wherein the carboxylate comprises ethyl propionate and at least one of ethyl acetate, propyl acetate, methyl propionate, propyl propionate, butyl propionate, pentyl propionate, ethyl butyrate, butyl butyrate, propyl butyrate, or pentyl butyrate.

21. The electrochemical device according to claim 1, wherein the polynitrile compound further comprises at least one of an ether dinitrile compound, an ether-free trinitrile compound, or an ether trinitrile compound.

* * * * *